US012013100B1

(12) United States Patent
Ji

(10) Patent No.: US 12,013,100 B1

(45) Date of Patent: Jun. 18, 2024

(54) DUAL-DRUM PROJECTION LAMP

(71) Applicant: Zhongshan Yong Qi Electronic Co., Ltd., Zhongshan (CN)

(72) Inventor: Shaoqi Ji, Zhongshan (CN)

(73) Assignee: Zhongshan Yong Qi Electronic Co., Ltd, Zhongshan (CN)

( * ) Notice: Subject to any disclaimer, the term of this patent is extended or adjusted under 35 U.S.C. 154(b) by 0 days.

(21) Appl. No.: 18/228,689

(22) Filed: Aug. 1, 2023

(51) Int. Cl.

| | |
|---|---|
| ***F21V 14/02*** | (2006.01) |
| ***F21V 15/01*** | (2006.01) |
| ***F21V 21/08*** | (2006.01) |
| ***F21V 29/67*** | (2015.01) |
| ***F21Y 115/10*** | (2016.01) |

(52) U.S. Cl.

CPC .............. *F21V 14/02* (2013.01); *F21V 15/01* (2013.01); *F21V 21/0824* (2013.01); *F21V 29/673* (2015.01); *F21Y 2115/10* (2016.08)

(58) Field of Classification Search

CPC ........ F21V 14/02; F21V 29/673; F21V 29/70; F21V 15/01; F21V 21/0824; F21V 21/30; F21V 31/005

See application file for complete search history.

(56) References Cited

U.S. PATENT DOCUMENTS

| | | | | |
|---|---|---|---|---|
| 10,400,966 | B2 * | 9/2019 | Chang | A63H 27/10 |
| 10,655,829 | B2 * | 5/2020 | Altamura | F21S 10/063 |
| 10,711,989 | B2 * | 7/2020 | Ishizawa | F21S 6/006 |
| 11,079,080 | B2 * | 8/2021 | Chien | F21S 10/002 |
| 11,168,868 | B2 * | 11/2021 | Huang | F21V 11/00 |
| 11,281,083 | B1 * | 3/2022 | Xin | G03B 21/145 |
| 11,287,094 | B2 * | 3/2022 | Zheng | F21V 33/0056 |
| 11,585,492 | B1 * | 2/2023 | Pang | F21V 9/00 |
| 11,662,071 | B1 * | 5/2023 | Wang | F21V 5/04 362/268 |
| 11,739,911 | B1 * | 8/2023 | Liu | F21V 29/70 362/269 |

* cited by examiner

*Primary Examiner* — Arman B Fallahkhair

(74) *Attorney, Agent, or Firm* — Jose Cherson Weissbrot

(57) ABSTRACT

The present disclosure discloses a new dual-drum projection lamp provided with a housing. A first projection mechanism and a second projection mechanism located on one side of the first projection mechanism are arranged in the housing. A transmission mechanism is further arranged in the housing. The transmission mechanism is configured to link the first projection mechanism and the second projection mechanism to enable the first projection mechanism and the second projection mechanism to rotate simultaneously, or the transmission mechanism is configured to respectively drive the first projection mechanism or the second projection mechanism to rotate. The present disclosure has the beneficial effects that by adopting a new transmission mode, a transmission structure is simpler. In addition, the new transmission mode can be implemented only by a single motor, so that the production cost is reduced, and the fault rate is also reduced.

7 Claims, 6 Drawing Sheets

DUAL-DRUM PROJECTION LAMP

TECHNICAL FIELD

The present disclosure relates to the technical field of projection lamps, and in particular to a new dual-drum projection lamp.

BACKGROUND

Projection lamps are widely used in the market, which can play roles in beautifying and enhancing the atmosphere. However, most of projection lamps on the current market present single illuminated lights or single projected patterns, so the function is relatively single.

In addition, there are also dual-drum projection lamps on the current market, but the transmission mode involves a plurality of motors in parallel, which is prone to faults and not conducive to customer use.

SUMMARY

In view of the deficiencies of the prior art, the present disclosure aims to provide a new dual-drum projection lamp. A transmission mode is redesigned to reduce the fault rate and the maintenance cost to the maximum extent. In addition, by arranging a convection hole, the problems of product cooling and water mist generation are effectively solved.

In order to achieve the above objectives, the present disclosure adopts the following technical solution:

A new dual-drum projection lamp is provided with a housing. A first projection mechanism and a second projection mechanism located on one side of the first projection mechanism are arranged in the housing. A transmission mechanism is further arranged in the housing. The transmission mechanism is configured to link the first projection mechanism and the second projection mechanism to enable the first projection mechanism and the second projection mechanism to rotate simultaneously, or the transmission mechanism is configured to respectively drive the first projection mechanism or the second projection mechanism to rotate.

It should be noted that, the transmission mechanism includes a rotating motor, a rotating gear, a first driven gear, a second driven gear, a first rotating rod and a second rotating rod, where a rotating shaft of the rotating motor is connected to the rotating gear, the first driven gear and the second driven gear are respectively engaged on both sides of the rotating gear, one end of the first rotating rod is connected to the first driven gear, an other end of the first rotating rod is connected to the first projection mechanism, one end of the second rotating rod is connected to the second driven gear, and an other end of the second rotating rod is connected to the second projection mechanism.

It should be noted that, the first projection mechanism includes a first light source module, a corrugated sheet and a spherical lens arranged in sequence, and the other end of the first rotating rod passes through the light source module and then is connected to the corrugated sheet, where the first light source module, the corrugated sheet and the spherical lens are located on a same axis, and the spherical lens is arranged on the housing.

It should be noted that, the second projection mechanism includes a second light source module, a condenser, a film box, a lens and a light-pervious sheet, and the other end of the second rotating rod passes through the second light source module, the condenser and the film box in sequence and then is connected to the lens, where in use, the second light source module, the condenser, the film box and the lens are located on a same axis, and the light-pervious sheet is arranged on the housing.

It should be noted that, a cooling fan and a convection hole are further arranged in the housing; the cooling fan is arranged at a bottom of the housing, and the convection hole is arranged on one side of the housing; and after the cooling fan is started, air flows between the convection hole and the cooling fan.

It should be noted that, the new dual-drum projection lamp further includes a base or a floor plug, where the base is connected to a bottom of the housing, or the floor plug is connected to the bottom of the housing.

It should be noted that, 8 to 12 light-emitting diode (LED) lamp beads are uniformly distributed in the second light source module; and the condenser is provided with light converging regions corresponding to the LED lamp beads in number.

It should be noted that, 8 LED lamp beads are provided.

The present disclosure has the following beneficial effects:

1. By adopting a new transmission mode, a transmission structure is simpler. In addition, the new transmission mode can be implemented only by a single motor, so that the production cost is reduced, and the fault rate is also reduced.
2. By arranging the convection hole, after the cooling fan is started, the temperature of the housing can be more effectively reduced. In addition, the convection hole can also play a role in removing water mist.

DETAILED DESCRIPTION

The technical solution in an embodiment of the present disclosure will be clearly and completely described below with reference to the accompanying drawings in the embodiment of the present disclosure. Based on the embodiment in the present disclosure, all other embodiments obtained by a person of ordinary skill in the art without creative efforts fall within the protection scope of the present disclosure.

Figure 1:
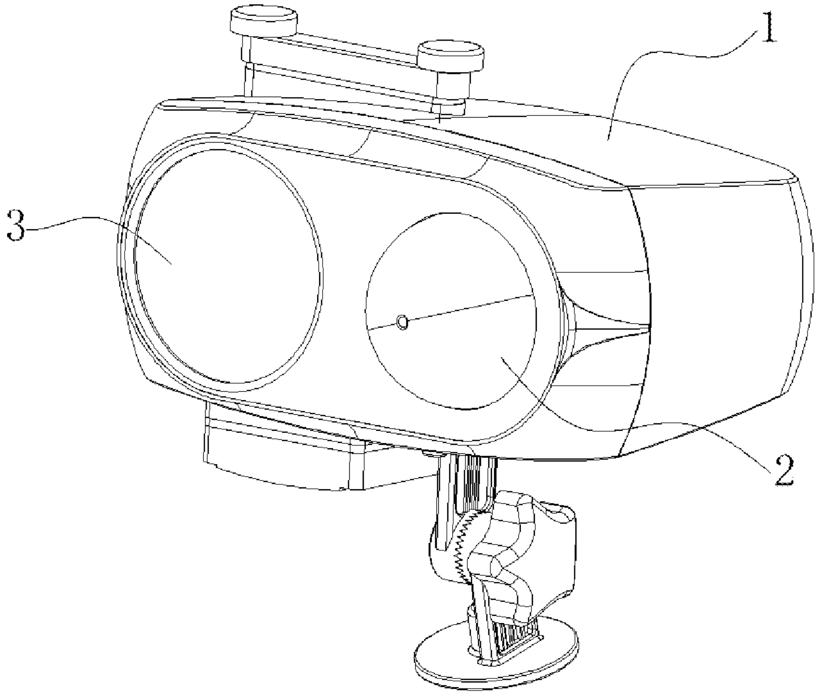
FIG. 1 is a schematic structural view of the present disclosure.
Figure 2:
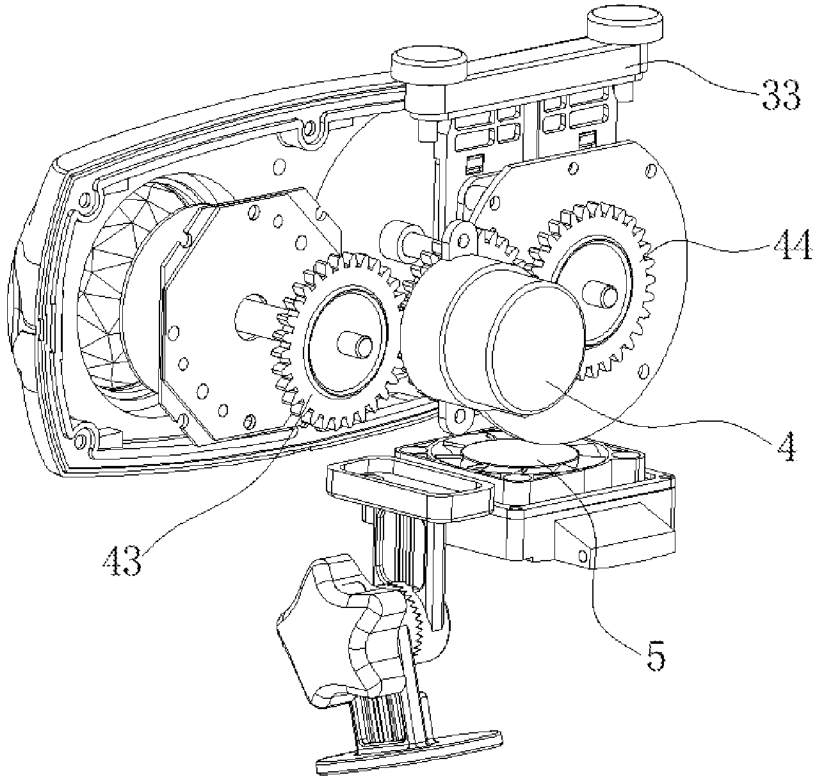
FIG. 2 is a schematic structural view of a transmission mechanism of the present disclosure.

As shown in FIG. 1 and FIG. 2, the present disclosure provides a new dual-drum projection lamp provided with a housing 1. A first projection mechanism 2 and a second projection mechanism 3 located on one side of the first projection mechanism 2 are arranged in the housing 1. A transmission mechanism 4 is further arranged in the housing 1 of the present disclosure. The transmission mechanism 4 is configured to link the first projection mechanism 1 and the second projection mechanism 2 to enable the first projection mechanism 1 and the second projection mechanism 2 to rotate simultaneously, or the transmission mechanism 4 is configured to respectively drive the first projection mechanism 1 or the second projection mechanism 2 to rotate.

Figure 3:
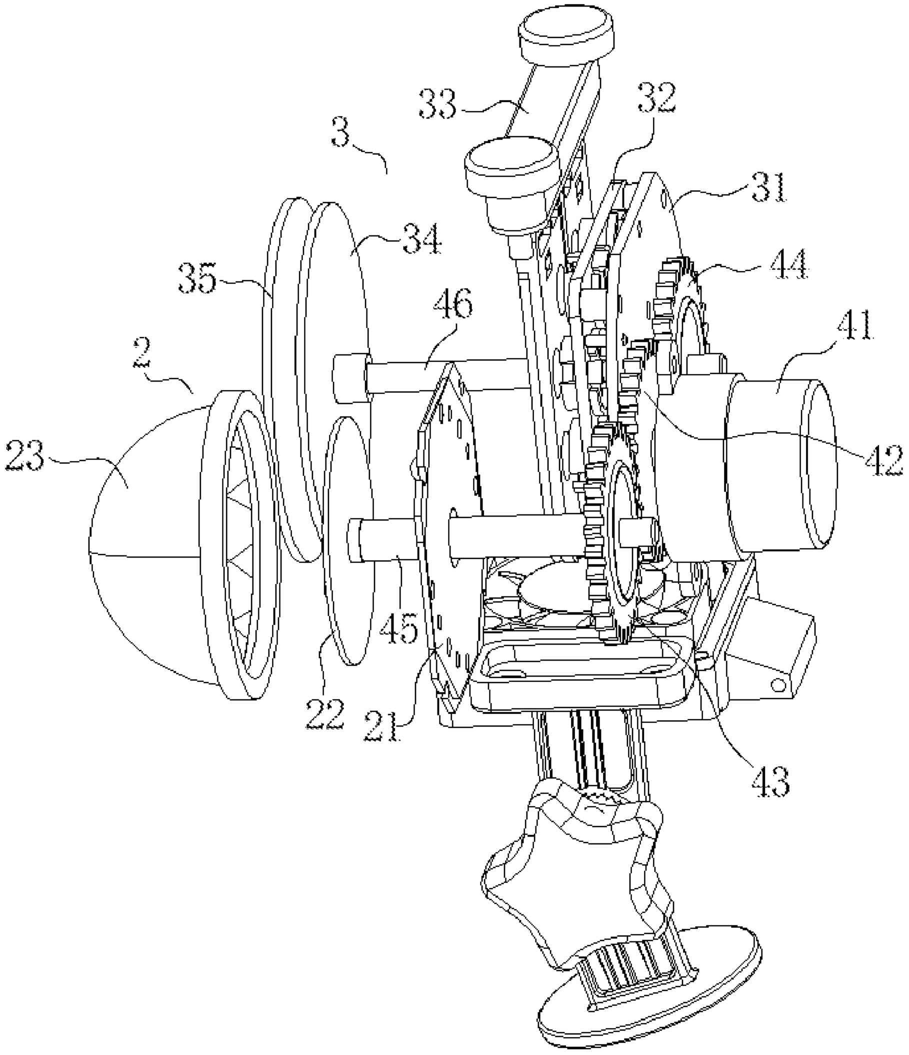
FIG. 3 is a schematic structural view of structural connection of a first projection mechanism, a second projection mechanism and a transmission mechanism of the present disclosure.

Further, as shown in FIG. 2 and FIG. 3, the transmission mechanism 4 of the present disclosure includes a rotating motor 41, a rotating gear 42, a first driven gear 43, a second driven gear 44, a first rotating rod 45 and a second rotating rod 46. A rotating shaft of the rotating motor 41 is connected to the rotating gear 42. The first driven gear 43 and the second driven gear 44 are respectively engaged on both sides of the rotating gear 42. One end of the first rotating rod 45 is connected to the first driven gear 43. An other end of the first rotating rod 45 is connected to the first projection mechanism. One end of the second rotating rod 46 is connected to the second driven gear 44. An other end of the second rotating rod 46 is connected to the second projection mechanism.

Further, as shown in FIG. 3, the first projection mechanism 2 of the present disclosure includes a first light source module 21, a corrugated sheet 22 and a spherical lens 23 arranged in sequence. The other end of the first rotating rod 45 passes through the light source module 21 and then is connected to the corrugated sheet 22. The first light source module 21, the corrugated sheet 22 and the spherical lens 23 are located on a same axis. The spherical lens is arranged on the housing.

Further, as shown in FIG. 3, the second projection mechanism 3 of the present disclosure includes a second light source module 31, a condenser 32, a film box 33, a lens 34 and a light-pervious sheet 35. The other end of the second rotating rod 46 passes through the second light source module 31, the condenser 32 and the film box 33 in sequence and then is connected to the lens 34. In use, the second light source module 31, the condenser 32, the film box 33 and the lens 34 are located on a same axis. The light-pervious sheet is arranged on the housing.

It should be noted that the structure of the film box adopted in the present disclosure is consistent with the structure of the film box adopted in the prior art. In fact, there are several films with preset patterns in an existing film box, and the preset patterns on the films can be projected through a light source.

Figure 4:
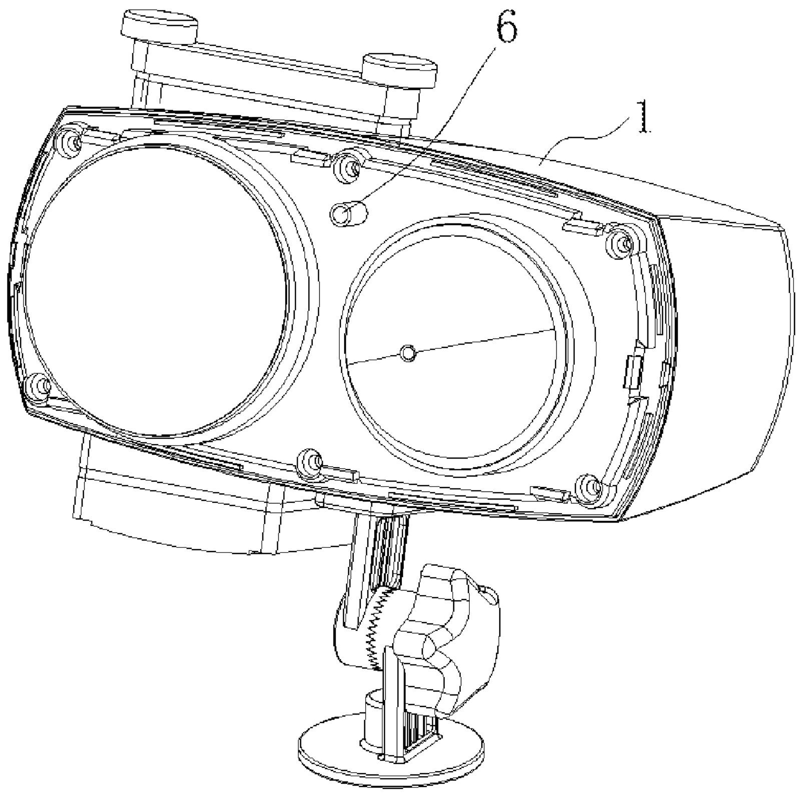
FIG. 4 is a schematic view of a structure in FIG. 1 with a convection hole.

Further, as shown in FIG. 2 and FIG. 4, a cooling fan 5 and a convection hole 6 are further arranged in the housing 1 of the present disclosure. The cooling fan 5 is arranged at a bottom of the housing 1, and the convection hole 6 is arranged on one side of the housing 1. After the cooling fan is started, air flows between the convection hole and the cooling fan.

Figure 5:
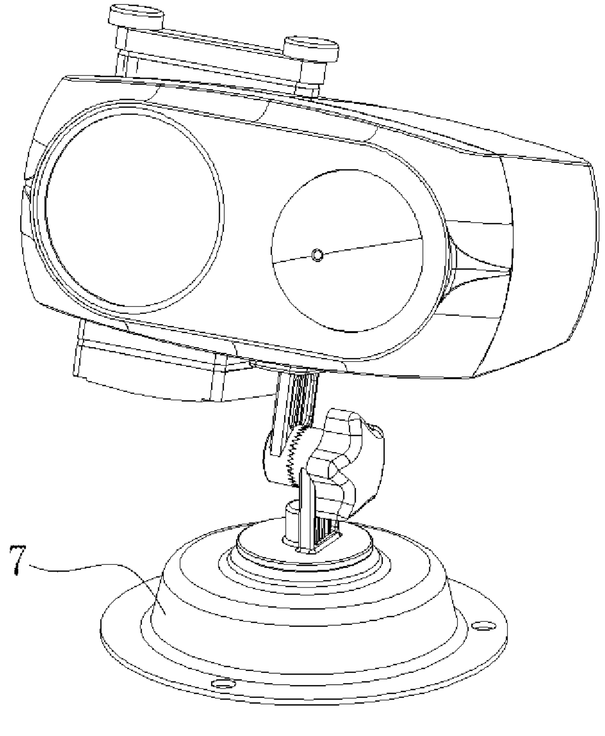
FIG. 5 is a schematic structural view of the present disclosure connected to a base.
Figure 6:
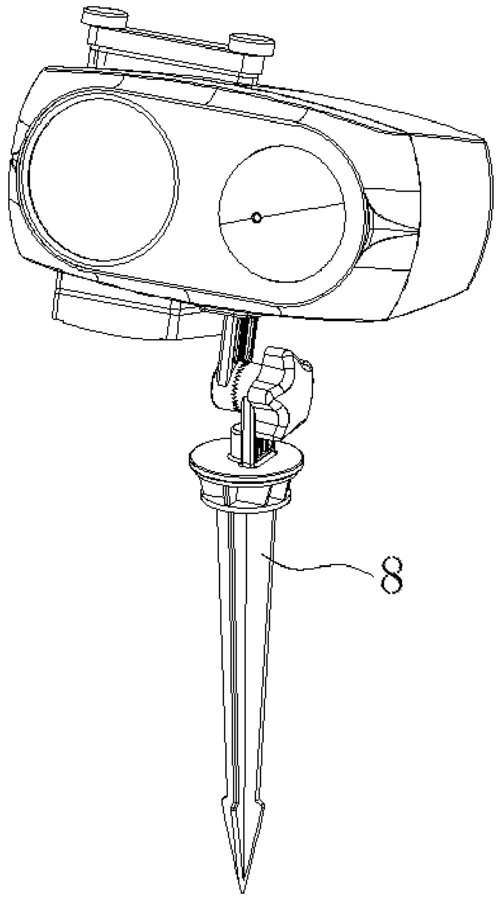
FIG. 6 is a schematic structural view of the present disclosure connected to a floor plug.

Further, as shown in FIG. 5 and FIG. 6, the present disclosure further includes a base 7 or a floor plug 8. The base is connected to a bottom of the housing, or the floor plug is connected to the bottom of the housing.

Further, 8 to 12 LED lamp beads are uniformly distributed in the second light source module of the present disclosure. The condenser is provided with light converging regions corresponding to the LED lamp beads in number.

As a preferred technical solution, 8 LED lamp beads are provided in the present disclosure.

Embodiment

In use, the present disclosure is started. After the rotating motor is started, the rotating gear is driven to rotate. At this time, the first driven gear and the second driven gear are driven by the rotating gear to rotate synchronously. Further, the first rotating rod and the second rotating rod respectively rotate synchronously. Finally, the corrugated sheet of the first projection mechanism and the lens of the second projection mechanism rotate at the same time, thereby achieving projection.

On the other hand, after the present disclosure is started, the cooling fan is started at the same time, and air flows between the convection hole and the cooling fan to form convection, which can not only effectively reduce the temperature in the housing, but also remove water mist.

Those skilled in the art can make various other corresponding changes and transformations according to the technical solution and concept described above. All these changes and transformations should fall within the protection scope of the appended claims.

What is claimed is:

1. A new dual-drum projection lamp, provided with a housing, a first projection mechanism and a second projection mechanism located on one side of the first projection mechanism being arranged in the housing, wherein a transmission mechanism is further arranged in the housing, wherein the transmission mechanism comprises a rotating motor, a rotating gear, a first driven gear, a second driven gear, a first rotating rod and a second rotating rod, wherein a rotating shaft of the rotating motor is connected to the rotating gear, the first driven gear and the second driven gear are respectively engaged on both sides of the rotating gear, one end of the first rotating rod is connected to the first driven gear, an other end of the first rotating rod is connected to the first projection mechanism, one end of the second rotating rod is connected to the second driven gear, and an other end of the second rotating rod is connected to the second projection mechanism, the transmission mechanism is capable of linking the first projection mechanism and the second projection mechanism to enable the first projection mechanism and the second projection mechanism to rotate simultaneously, wherein after the rotating motor is started, the rotating gear is driven to rotate, impelling both the first driven gear and the second driven gear to rotate synchronously, further, the first rotating rod and the second rotating rod respectively rotate synchronously, and a corrugated sheet of the first projection mechanism and a lens of the second projection mechanism rotate at the same time, enabling projection.

2. The new dual-drum projection lamp according to claim 1, wherein the second projection mechanism comprises a second light source module, a condenser, a film box, the lens and a light-pervious sheet, and the other end of the second rotating rod passes through the second light source module, the condenser and the film box in sequence and then is connected to the lens, wherein in use, the second light source module, the condenser, the film box and the lens are located on a same axis, and the light-pervious sheet is arranged on the housing.

3. The new dual-drum projection lamp according to claim 2, wherein 8 to 12 light-emitting diode (LED) lamp beads are uniformly distributed in the second light source module; and the condenser is provided with light converging regions corresponding to the LED lamp beads in number.

4. The new dual-drum projection lamp according to claim 3, wherein 8 LED lamp beads are provided.

5. The new dual-drum projection lamp according to claim 1, wherein the first projection mechanism comprises a first light source module, the corrugated sheet and a spherical lens arranged in sequence, and the other end of the first rotating rod passes through the first light source module and then is connected to the corrugated sheet, wherein the first light source module, the corrugated sheet and the spherical lens are located on a same axis, and the spherical lens is arranged on the housing.

6. The new dual-drum projection lamp according to claim 1, wherein a cooling fan and a convection hole are further arranged in the housing; the cooling fan is arranged at a bottom of the housing, and the convection hole is arranged on one side of the housing; and after the cooling fan is started, air flows between the convection hole and the cooling fan.

7. The new dual-drum projection lamp according to claim 1, further comprising a base or a floor plug, wherein the base is connected to a bottom of the housing, or the floor plug is connected to the bottom of the housing.

* * * * *